United States Patent
Koy

(10) Patent No.: US 6,722,686 B2
(45) Date of Patent: Apr. 20, 2004

(54) COUPLER LOCKING DEVICE AND METHOD

(75) Inventor: Tim Vander Koy, Mosinee, WI (US)

(73) Assignee: Cequent Trailer Products, Inc., Mosinee, WI (US)

( * ) Notice: Subject to any disclaimer, the term of this patent is extended or adjusted under 35 U.S.C. 154(b) by 0 days.

(21) Appl. No.: 10/136,044

(22) Filed: May 1, 2002

(65) Prior Publication Data

US 2003/0205884 A1 Nov. 6, 2003

(51) Int. Cl.$^7$ .............................................. B60D 1/173
(52) U.S. Cl. ....................................... 280/507; 280/511
(58) Field of Search .............................. 280/507, 511; 70/14, 18, 19, 38 A, 39, 58, 258, 232, 237, 234, 235; 248/551–553

(56) References Cited

U.S. PATENT DOCUMENTS

| | | | |
|---|---|---|---|
| 1,543,397 A | * | 3/1925 | Schroeder |
| 2,571,349 A | | 10/1951 | Eckles |
| 3,884,055 A | | 5/1975 | Vuillemot |
| 4,032,171 A | * | 6/1977 | Allen et al. ................ 280/507 |
| 4,141,569 A | | 2/1979 | Dilk |
| 4,459,832 A | | 7/1984 | Avrea et al. |
| 4,538,827 A | | 9/1985 | Plifka |
| 4,577,884 A | * | 3/1986 | Harris ........................ 280/507 |
| 4,836,570 A | * | 6/1989 | Lopez et al. ................ 280/507 |
| 5,087,064 A | * | 2/1992 | Ghulin ........................ 280/507 |
| 5,094,423 A | * | 3/1992 | Almquist et al. ........... 248/552 |
| 5,219,435 A | | 6/1993 | Sprunger |
| 5,433,468 A | | 7/1995 | Dixon |
| 5,476,281 A | | 12/1995 | Worthington |
| 5,584,495 A | * | 12/1996 | Mason ........................ 280/507 |
| 5,700,024 A | | 12/1997 | Upchurch |
| 5,794,961 A | | 8/1998 | Niswanger |
| 5,823,021 A | * | 10/1998 | Chang ........................ 70/38 A |
| 6,155,589 A | * | 12/2000 | Simpson ..................... 280/507 |
| 6,412,313 B1 | * | 7/2002 | Bernstrom ..................... 70/14 |
| 6,412,314 B1 | * | 7/2002 | Jenks ............................. 70/14 |

* cited by examiner

Primary Examiner—Lesley D. Morris
Assistant Examiner—Tony Winner
(74) Attorney, Agent, or Firm—Robert H. Earp, III; McDonald Hopkins Co., LPA

(57) ABSTRACT

A device for closing the socket of a trailer hitch, generally called a coupler lock, generally comprises a locking bar and a base having a plug member, a locking bar-receiving aperture, and an integral locking means for lockingly engaging the locking bar within aperture. When the coupler lock is attached to a trailer coupler, the trailer hitch socket is not accessible without removing the coupler lock with the appropriate key. Thus, theft of an unattended trailer is deterred due to the difficulty in attempting to remove the locking device. Providing a coupler lock having an integral locking mechanism better deters the tampering with or removal of the locking mechanism to remove the coupler lock from the trailer hitch as is possible in the art.

18 Claims, 3 Drawing Sheets

COUPLER LOCKING DEVICE AND METHOD

FIELD OF INVENTION

The present invention relates generally to locking devices for trailer hitches to deter the unauthorized towing of a trailer to which the hitch is attached, and more particularly, to a locking device which closes the socket portion of the trailer hitch and has an integral locking means to deter the tampering or removal therefrom.

BACKGROUND OF THE INVENTION

Standard trailer hitches, such as those used for boat and car trailers, campers, and the like, utilize a socket for engaging a standardized ball joint mounted on a towing vehicle. Such standard trailer hitch sockets are manufactured to receive most standard ball joint sizes to permit interchangeability between various trailers and towing ball joints. However, due to this interchangeability, it is possible for an unauthorized person having a standard ball joint mounted to a vehicle to hitch up an unattended and unattached trailer and tow the trailer away with any associated cargo it may carry.

Locking devices have long been employed to prevent or deter the theft of unattended and unattached trailers. However, while such locking devices can be a deterrent, the locking devices of the prior art are particularly unsuited for preventing or greatly deterring the theft of an unattended and unattached trailer by a motivated thief. Particularly, the locking devices of the prior art utilize easily accessible standard padlocks for mounting the locking device to the trailer hitch. Easily accessible padlocks allow thieves the opportunity to cut the padlock shackle with, for example, a metal saw or bolt cutters or allow thieves to possibly break the padlock off the locking device so that it can be removed from the trailer hitch. While several products have attempted to address this issue, none have fully addressed the issue to the extent necessary.

A coupler locking device typical in the art is disclosed in U.S. Pat. No. 3,884,055 issued on May 20, 1975 to Dale F. Vuillemot, which discloses an elongated plate having a plug which closes at least a portion of the opening in the trailer hitch socket and a bar which can be positioned over the trailer hitch and locked in place so that the socket portion or the trailer hitch is contained between the bar and the elongated plate. However, the '055 patent locking device utilizes a standard padlock to lock the bar with respect to the plate. Therefore, an unattended trailer utilizing the locking device of the '055 patent is susceptible to theft if the accessible padlock is broken or cut off thereby allowing the unauthorized removal of the locking device.

An attempt to prevent access to the padlock used in such couple locking devices is disclosed in U.S. Pat. No. 4,141, 569 issued on Feb. 27, 1979 to Larry W. Dilk, which discloses a locking device having a frame and cover which define a closure for sheltering the locking plates and the padlock to prevent tampering with the padlock or locking plates. However, although access to the padlock is limited compared to the prior art, the padlock is still accessible to a thief for breaking, cutting, or tampering therewith so as to remove the locking device from the trailer hitch.

The locking device disclosed in U.S. Pat. No. 4,459,832 issued on Jul. 17, 1984 to Walter C. Avrea et al. attempts to utilize a locking means other than a padlock. The '832 patent discloses a lock module which receives and locks therein essentially all of the extending ends of both the pivot pin and the retaining pin of the coupling guard to preclude unauthorized pivotal movement of the coupling guard. However, while a padlock is not utilized, the locking module is not integral with respect to the locking device and continues to be accessible. A thief could tamper with the locking module, attempt to break off the lock module from the guard, or cut the accessible retaining/pivot pins to permit removal of the locking device.

The locking device of the present invention overcomes the disadvantages of the prior art devices by providing a device for closing the socket of a trailer hitch having an integral locking means.

BRIEF SUMMARY OF THE INVENTION

This object is achieved through providing a device for closing the socket of a trailer hitch, generally called a coupler lock, generally comprising a locking bar and a base having a plug member, a locking bar-receiving aperture, and an integral locking means for lockingly engaging the locking bar within aperture.

It is an object of the present invention to provide a coupler lock having an integral locking mechanism to deter the tampering with or removal of the locking mechanism and removing the coupler lock from the trailer hitch.

The present invention will be more fully described in the following written description with reference to the accompanying drawings.

DETAILED DESCRIPTION OF THE INVENTION

Figure 1:
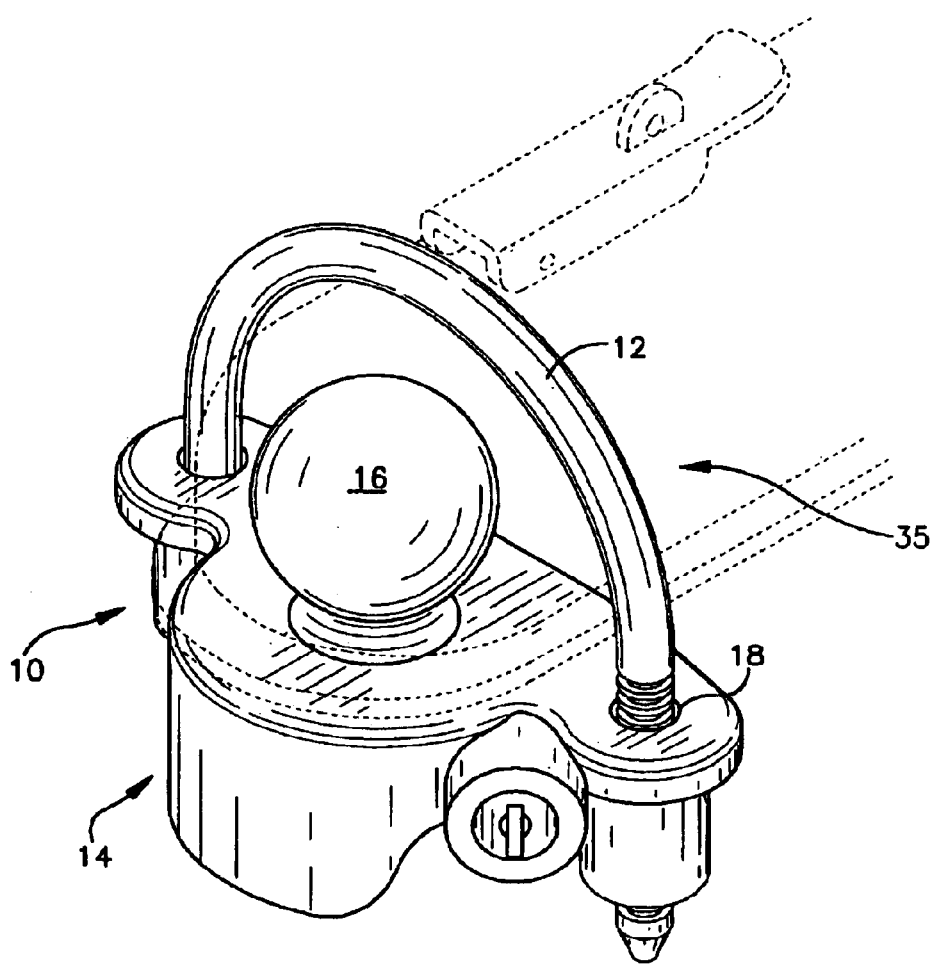
FIG. 1 is perspective view of the locking device in a locked position on a trailer hitch tongue, the trailer hitch tongue being shown in phantom.
Figure 2:
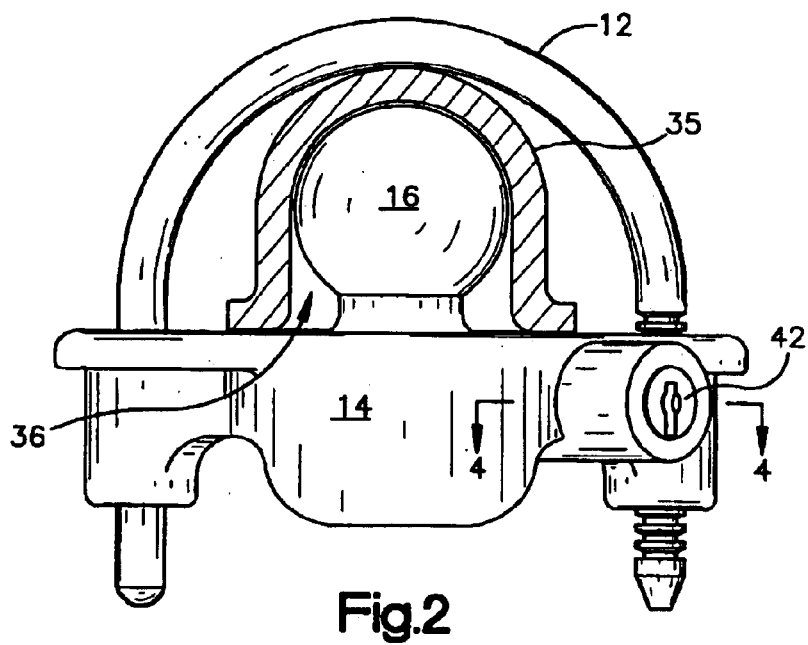
FIG. 2 is a front elevational view of the locking device of FIG. 1, wherein the trailer hitch is shown in cross-section for better understanding.

Referring now to the drawings, and in particular to FIG. 1, a device for closing the socket of a trailer hitch, or coupler lock, generally designated as reference numeral 10 is shown. The coupler lock 10 of the present invention comprises a locking bar or shackle 12 and a base 14 having a plug member 16, at least one locking bar-receiving aperture 18, and an integral locking means for lockingly engaging the locking bar 12 within aperture 18. When the coupler lock 10 is attached to a trailer hitch coupler 35, as shown in FIG. 2, the trailer hitch socket is not accessible without removing the coupler lock with the appropriate key. Thus, theft of an unattended trailer is prevented are at least deterred due to the difficulty in removing the locking device. The components of the present invention may be cast or machined from metal such as steel, aluminum, or the like.

Figure 3:
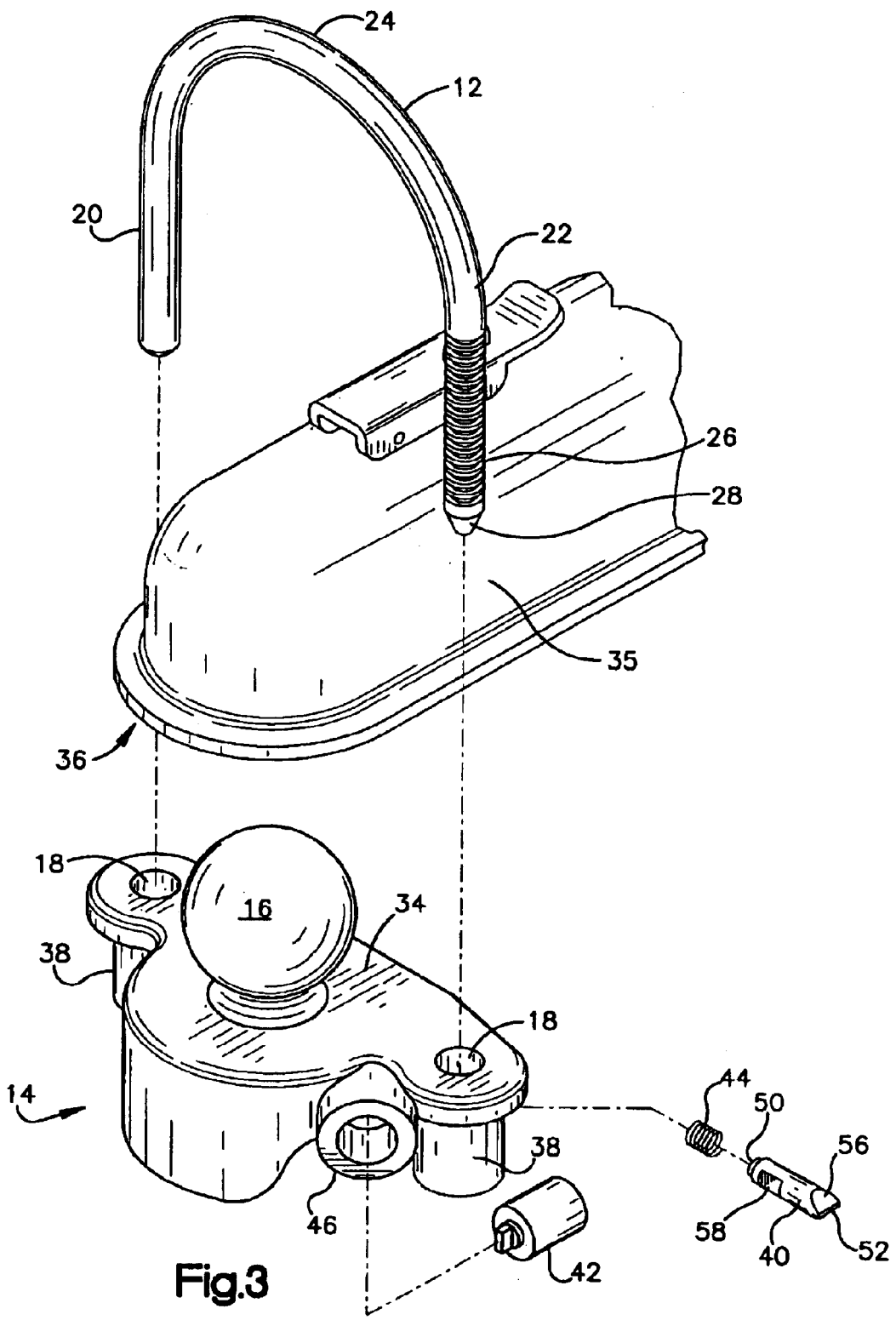
FIG. 3 is an exploded view of the locking device showing the parts thereof.

Particularly shown in FIG. 3, locking bar 12 comprises an inverted, generally U-shaped member having a pair of arms 20, 22 interconnected by a curved end portion 24. Located on one arm 22 are a plurality of lock-engageable grooves 26 and tip 28. In the preferred embodiment, the other arm 20 has no grooves.

Figure 6:
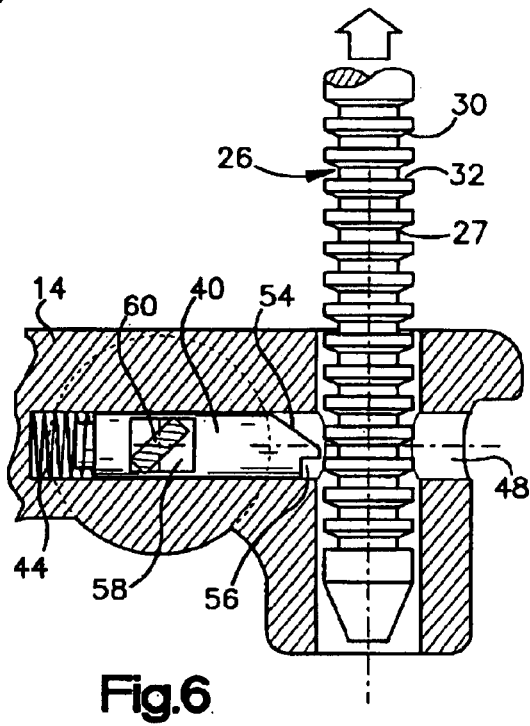
FIG. 6 is a cross-sectional view of the locking means similar to the view of FIG. 5, except showing the locking means in disengagement with the locking bar.

With particular reference to FIG. 6, each groove 26 comprises a channel 27 located annularly about arm 22. Each groove 26 is defined at its proximal end, the end nearest the end portion 24, by a inclined camming surface 30 and at its distal end, the end nearest the tip 28 of the arm, by a groove shoulder 32. As describe in detail below, such a construction permits the downward movement of the arm through the aperture and prevents its removal from the aperture during engagement of the locking bolt. Tip 28 is generally V-shaped to permit ease of access of the arm 22 into aperture 18 and past the locking bolt during locked engagement.

Referring to FIG. 3, base 14 comprises a generally flat surface 34 having a plug member 16 mounted thereon for receipt within a typical trailer hitch socket 36. Preferably the plug member 16 comprises a standard 1⅞" diameter hitch ball that can be used with nearly all trailer coupler sockets. Because the majority of trailer coupler sockets are designed to receive either a 1⅞" or 2" diameter standard hitch ball, the preferred embodiment of the present invention utilizes the smaller standard ball so that it can fit within either designed socket. Further, it is also anticipated that the plug member may be removable from the base 14 so that the coupler lock 10 of the present invention could be utilized with trailer hitches requiring various sized plug members.

Extending vertically through the surface 34 of the base 14 and located on either side of the plug member 16 are apertures 18. Apertures 18 are designed to receive the distal ends of each locking bar arm 20, 22 and may be any size which corresponds to the diameter of the arms. Extending downwardly from the generally flat surface 34, coaxial with the apertures 18, are a pair of sleeves 38 which protect the arms 20, 22 from tampering. The sleeves 38 further provide stability and strength to the connection between the locking bar and the base. According to the preferred embodiment of the invention, a portion of the locking bolt 40 is located within the interior of one of the sleeves 38 to lockingly engage the grooves 26 of arm 22 so as to prevent the arms removal therefrom.

Integrally formed within the base 14 is a locking means which prevents the removal of the locking arms 20, 22 from the apertures 18. While numerous configurations of an integral locking means could be utilized by the invention, the preferred embodiment utilizes a bolt-type locking mechanism. The locking mechanism is housed within the base 14 to prevent tampering with or breaking the locking mechanism to remove the coupler lock 10 as is possible with prior art devices.

Figure 4:
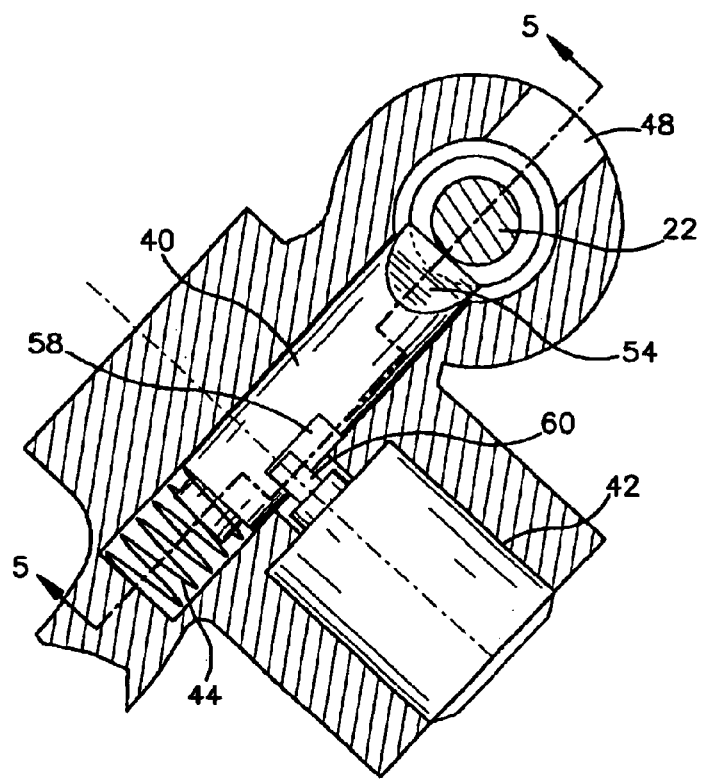
FIG. 4 is a cross-sectional view of the locking means taken along line 4—4 of FIG. 2 showing the locking means in locked engagement with the locking bar.
Figure 5:
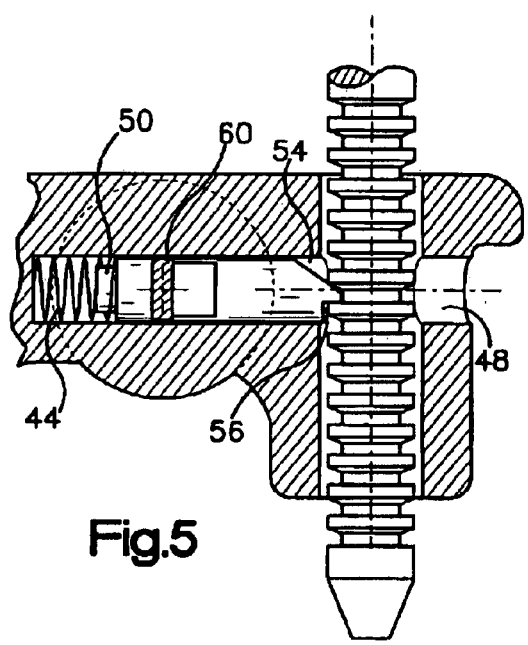
FIG. 5 is a cross-sectional view of the locking means taken along line 5—5 of FIG. 4 showing the locking means in locked engagement with the locking bar.

The locking mechanism of the preferred embodiment comprises a key mechanism 42, a spring 44, and a bolt 40 moveable between a locked position and an unlocked position. The key mechanism is housed within a locking sleeve 46 attached to the base 14. The key mechanism 42 is mounted within the bore of sleeve 46. As best shown in FIGS. 4 through 6, a locking bolt bore 48 extends through one sleeve 38 and into the base 14 to provide a channel in which a locking bolt 40 may move between a locked and unlocked position. The bore of locking sleeve 46 is in communication with the locking bolt bore 48 so that the key mechanism 42 can manipulate the bolt 40 between a locked and unlocked position. Located between the base of bore 48 and the locking bolt 40 is spring 44. The spring 44 is held within the bore 48 so that the spring 44 is compressed and spring loads the bolt 40 into the locked position.

Bolt 40 comprises a generally cylindrical member having a spring seat 50 at one end and a groove-engaging surface 52 at the other. The groove-engaging surface comprises a slanted flange 54 on one side of the bolt 40 and a shoulder 56 located on the other side. Located intermediate the groove-engaging surface 52 and the spring seat 50 is a bolt slot 58.

The key mechanism 42 comprises a key-receiving mechanism having a tab 60 which is rotatable upon insertion and turning of the appropriate key. When the spring 44 and bolt 40 are placed within the bore 48 and the key mechanism 42 is mounted within the bore of the lock sleeve 46, tab 60 is nested within bolt slot 58 as shown in FIGS. 4 and 5. This resting position is also the locked position wherein the compressed spring 44 forces bolt 40 into aperture 18 so that the groove-engaging portion 52 of the bolt 40 can engage the grooves 26 of arm 22. Upon rotation of an appropriate key within the key mechanism 42, tab 60 is rotated within the bolt slot 58 and engages slot 58 to force the bolt 40 inwardly to overcome the spring force, as shown in FIG. 6, thereby placing the locking mechanism in the unlocked position.

Therefore, the rotational movement of the key mechanism 42 is translated into liner movement of the bolt 40 within the bolt bore to move against the spring and remove the bolt from its locked position. In doing so, the arm 22 is freely movable within the aperture 18 and can be removed therefrom. Upon removal of the appropriate key from the key mechanism 42, the bolt 40 is again forced into its locking position by the spring 44 as shown in FIGS. 4 and 5.

In operation, the coupler lock 10 may be adjustably mounted to any size trailer coupling so as to prevent or deter the unauthorized hitching of the trailer. With particular reference to FIG. 2, the plug member 16 on base 14 is placed within the ball socket 36 of a trailer hitch coupler 35. The locking bar 12 is then placed over the coupler 35 and each arm 20, 22 is inserted into the corresponding locking bar receiving aperture 18 located on opposite sides of the base. The locking bar 12 passed downwardly through aperture 18 during adjustment while the grooves 26 pass over the locking bolt 40 which is spring loaded into the locked position. Adjustment is completed when a snug fit is achieved and a portion of the locking bar rests on top of the coupler 35 and the plug member 16 is nested securely within the coupler ball socket 36. When the coupler lock 10 is snugly mounted on the trailer coupler 35, the trailer ball socket 36 is not accessible to another trailer ball and prevented from unauthorized hitching without use of the appropriate key.

The locking bar arms 20, 22 are designed to be insertable within the pair of apertures 18 located in the base 14 and lockingly engaged at a plurality of positions therealong so that the device may accommodate trailer hitch sockets of variable heights. Although both arms may be locked in place relative to the base, the preferred embodiment locks only one arm in place relative to the base. Such locking engagement is accomplished by the preferred embodiment by providing a plurality of lock-engageable grooves 26 located on one arm which engage a portion of the locking bolt 40 as described above. Each groove 26 may be engaged by the locking bolt 40 to prevent the removal of the locking bar 12 from the aperture 18.

Due to the construction of the locking mechanism, the locking bar 12 can be adjusted downwardly into further locked engagement without the use of a key so that a snug fit is ensured. Although bolt 40 is moveable between a locked position, shown in FIGS. 4 and 5, and an unlocked position shown in FIG. 6, spring 44 continuously urges bolt 40 into the locked position. Only upon use of the appropriate key and rotation of tab 60 may the bolt 40 be moved to overcome the force of the spring and place the device in the unlocked position.

In the locked position as shown in FIGS. 4 and 5, the slanted flange 54 and shoulder 56 of the bolt 40 are spring loaded to confront the camming surface 30 and groove shoulder 32 to lock the arm in place. Therefore, due to the construction of the bolt and grooves, the arm 22 is moveable downwardly through the aperture 18 but not removable therefrom when the device is in the locked position. Upon downward movement of the arm 22, the bolt 40 is forced to retract by the slanted flange 54 and permits further locking engagement of the arm 22 with respect to the bolt 40. When the device is in the locked position, arm 22 is prevented from being removed from the aperture 18 by the engagement between the bolt shoulder 56 and groove shoulder 32.

Although the preferred embodiment of the present invention utilizes a locking bar of inverted, U-shape, it is further conceived that the locking bar may be of any configuration wherein at least a portion of the locking bar rests on top of the trailer hitch socket during locking engagement. Further, although the preferred embodiment utilizes a locking bar having a pair of arms, it is further conceived that the locking bar may include only one arm or more than two arms with which to lockingly engage the base. Such a locking bar of another embodiment may conceivable take the shape of an L-shaped locking member. Likewise, while the base of the preferred embodiment includes a pair of arm-receiving apertures, the base could include one or a plurality of arm receiving apertures as required and lockingly engage on or a plurality of arms associated therewith.

The invention has been described with reference to the preferred embodiment. Obviously, modifications and alternations will occur to others upon a reading and understanding of this specification. The claims as follows are intended to include all modifications and alterations insofar as they come within the scope of the claims or the equivalents thereof.

Having thus described the invention, I claim:

1. A device for closing the a socket of an unhitched trailer hitch coupler, said device comprising:

a locking bar wherein at least a portion thereof rests on top of the trailer hitch coupler; and a base comprising a plug member for receipt within said trailer hitch coupler socket, a locking bar-receiving aperture, and an integral locking means for lockingly engaging said locking bar within said aperture.

2. The device of claim 1 wherein said integral locking means comprises a bolt and key mechanism for operating said bolt housed within said base.

3. The device of claim 2 wherein said bolt is moveable between a locked position wherein said bolt engages said locking bar within said aperture thereby preventing removal of said locking bar from said aperture and an unlocked position wherein said bolt does not engage said locking bar within said aperture thereby permitting removal of said locking bar from said aperture.

4. A device for closing a socket of an unhitched trailer hitch coupler, said device comprising:

a locking bar wherein at least a portion thereof rests on top of the trailer hitch coupler; and a base comprising a plug member for receipt within said trailer hitch coupler socket, a locking bar-receiving aperture, and an integral lock for lockingly engaging said locking bar within said aperture.

5. The device of claim 4 wherein said locking bar may be locked within said aperture at a plurality of positions therealong so that said device may accommodate trailer hitch couplers of variable heights.

6. The device of claim 4, wherein said locking bar includes at least one lock-engagable groove thereon permitting said locking bar to be locked within said aperture at a discrete position therealong.

7. The device of claim 6, wherein said locking bar includes a plurality of lock-engagable grooves thereon permitting said locking bar to be locked within said aperture at a plurality of discrete positions therealong so that said device may accommodate trailer hitch couplers of variable heights.

8. A device for closing a socket of an unhitched trailer hitch coupler member, said device comprising:

a locking bar having a pair of arms, wherein at least a portion of said locking bar rests on top of the trailer hitch coupler;

a base comprising a plug member for receipt within the trailer hitch coupler socket, a pair of arm-receiving apertures, and an integral lock for lockingly engaging a first said arm within a corresponding said arm-receiving aperture.

9. The device of claim 8 wherein said first arm may be locked within said corresponding arm-receiving aperture at a plurality of positions therealong so that said device may accommodate trailer hitches couplers of variable heights.

10. The device of claim 8 wherein said locking bar comprises an inverted U-shaped member.

11. The device of claim 10, wherein said first arm includes at least one lock-engagable groove thereon permitting said first arm to be locked within said aperture at a discrete position therealong.

12. The device of claim 10, wherein said first arm includes a plurality of lock-engagable grooves thereon permitting said first arm to be locked within said aperture at a plurality of discrete positions therealong.

13. A device for closing a socket of an unhitched trailer hitch coupler member, said device comprising:

an inverted U-shaped locking bar having a pair of arms, wherein at least a portion of said locking bar rests on top of the trailer hitch coupler;

a base comprising a pair of arm-receiving apertures located therein, a plug member for receipt within the trailer hitch socket located intermediate said apertures, and an integral lock for lockingly engaging a first said arm within a corresponding said arm-receiving aperture.

14. The device of claim 13, wherein said first arm may be locked within said corresponding arm-receiving aperture at a plurality of positions therealong so that said device may accommodate trailer hitches couplers of variable heights.

15. The device of claim 13, wherein said first arm includes at least one lock-engageable groove thereon permitting said first arm to be locked within said aperture at a discrete position therealong.

16. The device of claim 15, wherein said first arm includes a plurality of lock-engageable grooves thereon permitting said first arm to be locked within said aperture at a plurality of discrete positions therealong.

17. A method for closing the a socket of an unhitched trailer hitch coupler member, said method comprising the steps of:

provding a locking bar;

providing a base comprising a plug member, a locking bar-receiving aperture, and an integral lock;

inserting said plug member into the trailer hitch coupler socket;

inserting a portion of said locking bar into said locking bar-receiving aperture, wherein a least a portion of said locking bar rests on top of said trailer hitch coupler; and locking said locking bar within said locking bar-receiving aperture.

18. A method for closing a socket of an unhitched trailer hitch coupler member, said method comprising the steps of:

inserting a plug member into a trailer hitch coupler socket, said plug member being attached to a base having a pair of arm receiving apertures extending therethrough and an integral lock;

providing an inverted, U-shaped locking bar having a pair of arms;

inserting said pair of arms into said pair of arm receiving apertures, wherein a portion of said locking bar rests on top of said trailer hitch coupler; and locking at least one said arm within at least one said aperture.

* * * * *

UNITED STATES PATENT AND TRADEMARK OFFICE
CERTIFICATE OF CORRECTION

PATENT NO. : 6,722,686 B2
DATED : April 20, 2004
INVENTOR(S) : Tim Vander Koy

It is certified that error appears in the above-identified patent and that said Letters Patent is hereby corrected as shown below:

Column 5,
Line 49, remove the word "the"

Column 6,
Lines 36 and 62, remove the word "hitches" and replace with -- hitch --.

Column 7,
Line 3, remove the word "the"

Signed and Sealed this

Sixteenth Day of November, 2004

JON W. DUDAS
*Director of the United States Patent and Trademark Office*